(12) United States Patent
Morikawa et al.

(10) Patent No.: US 6,680,277 B2
(45) Date of Patent: Jan. 20, 2004

(54) PHOTOCATALYTIC SUSBSTANCE

(75) Inventors: Takeshi Morikawa, Aichi-gun (JP); Yasunori Taga, Aichi-gun (JP); Tadashi Nakamura, Aichi-gun (JP); Yoshiaki Fukushima, Aichi-gun (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 101 days.

(21) Appl. No.: 09/905,861

(22) Filed: Jul. 17, 2001

(65) Prior Publication Data

US 2002/0006865 A1 Jan. 17, 2002

(30) Foreign Application Priority Data

Jul. 17, 2000 (JP) ........................................ 2000-216515
Jun. 19, 2001 (JP) ........................................ 2001-184955

(51) Int. Cl.⁷ .............................................. B01J 27/24
(52) U.S. Cl. .................... 502/182; 502/200; 502/350
(58) Field of Search ................................. 502/174, 200, 502/202, 208, 215, 237, 224, 340, 349, 350, 352, 226, 227, 182

(56) References Cited

U.S. PATENT DOCUMENTS

| 5,981,426 | A | 11/1999 | Langford et al. ............ 502/309 |
| 6,180,548 | B1 | 1/2001 | Taoda et al. ................. 501/137 |
| 2001/0056037 | A1 * | 12/2001 | Sakatani et al. ............. 502/350 |
| 2002/0071970 | A1 * | 6/2002 | Elder et al. .................. 428/702 |
| 2002/0077251 | A1 * | 6/2002 | Okusako et al. ............. 502/350 |
| 2002/0151434 | A1 * | 10/2002 | Domen et al. ............... 502/200 |
| 2002/0169076 | A1 * | 11/2002 | Takeshi et al. .............. 502/350 |

FOREIGN PATENT DOCUMENTS

| EP | 0997191 A1 | * | 5/2000 |
| EP | 1205244 A1 | * | 5/2002 |
| JP | 08134630 | * | 5/1996 |
| JP | 09075748 | * | 3/1997 |
| JP | 09262482 | * | 7/1997 |
| JP | 11-253750 | | 9/1999 |
| JP | 11333304 | * | 12/1999 |
| JP | 2000-19310 | | 1/2000 |
| JP | 2000-33265 | | 2/2000 |
| JP | 2000-70710 | | 3/2000 |
| JP | 2000140636 A | * | 5/2000 |
| JP | 2000-140636 | | 5/2000 |
| JP | 2001-335308 | * | 4/2001 |
| JP | 2001-205104 | | 7/2001 |
| WO | WO 01/10552 | | 2/2001 |
| WO | WO 01/10553 | | 2/2001 |

* cited by examiner

*Primary Examiner*—Stuart L. Hendrickson
*Assistant Examiner*—Peter J Lish
(74) *Attorney, Agent, or Firm*—Oblon, Spivak, McClelland, Maier & Neustadt, P.C.

(57) ABSTRACT

The invention features a photocatalytic body including: a porous medium 12 formed on a substrate 10; and photocatalytic material 14 supported on the porous medium. Supporting the photocatalytic material 14 on the porous medium 12 enables enhancement of its catalytic activity.

6 Claims, 4 Drawing Sheets

N1s shell XPS profile of Ti-O-N photocatalyst

Irradiation wavelength dependency of Ti-O-N photocatalytic property

Example of FSM structure

Properties of photocatalytic substances having Ti-O-N supplied to surface of FSM Properties of photocatalytic substances of Ti-O-N supplied into and on the surface of FSM which is vertically oriented on the substrate surface (film forming with irradiation of $\lambda \geqq 400$ nm under 0.5 Pa)

PHOTOCATALYTIC SUSBSTANCE

BACKGROUND OF THE INVENTION a) Field of the Invention

The present invention relates to a photocatalytic substance which operates in visible light, and more particularly to an improvement of the catalytic function of such a photocatalytic substance.

b) Description of the Related Art

The use of titanium oxide as a photocatalytic substance is known conventionally, and its use in various fields is being studied. In known photocatalysts using titanium oxide, catalytic function is observed under exposure to ultraviolet light with a wavelength shorter than 410 nm, but is not observed under visible light with a longer wavelength. Only about 5% of sunlight, falls in the ultraviolet light range, so that known titanium oxide-based photocatalysts do not exhibit a sufficient catalytic function under sunlight. Thus, an ultraviolet light source, such as a mercury lamp, is sometimes separately provided to irradiate ultraviolet light on the photocatalyst in order to exhibit sufficient photocatalytic function.

Photocatalysts which can use visible light as operation light are also being studied, and there have been reports concerning such photocatalysts.

For example, there is proposed a method of adsorbing to titanium oxide a pigment which absorbs visible light. Some methods of doping a metallic element such as Cr or V to titanium oxide have been reported in the past 30 years. In addition, Japanese Patent Application Laid-Open Publication No. Hei 9-262482 discloses a method of doping a metallic element such as Cr or V to titanium oxide by an ion implantation technology and then applying a heat treatment.

However, photocatalysts having an adsorbed pigment are disadvantageous in that the pigment has a short life, and that they do not constantly exhibit sufficient catalytic function. According to the metal doping method, the catalytic function will probably not improve because the doped metal elements form an oxide and aggregate with metals. Therefore, reproducibility in manufacturing is poor, and, even when doping is successful, there is a problem that functionality tends to deteriorate as the device is used. As compared with simple metallic doping, functionality can be made more stable by employing ion implantation technology. However, ion implantation methods are disadvantageous in that the production costs are high, which makes difficulty in practical use except particular application.

SUMMARY OF THE INVENTION

The present invention was achieved in view of the above circumstances and it is an object of the present invention to provide a photocatalytic substance which can exert a stable photocatalytic function when irradiated by light in a visible range, and which can be produced easily and at a low cost.

The photocatalytic substance according to the present invention comprises a photocatalyst material, MOaXb (M is metal, O is oxygen, X is any element, a=1.5 to 2.0, b=0.01 to 0.5), which operates under visible light, or is activated by visible light, supported on a porous medium. Supporting the photocatalyst material on the porous medium enhances the efficiency of the operation of the photocatalyst material under visible light.

The aforesaid M may be one or more of Ti, Sn and Zn, and the aforesaid X is at least one of N, S, P, B, C, Cl, As, Se, Br, Sb, Te and I. These materials can be used to make a photocatalyst effective under visible light.

For the photocatalytic substance may include one or more of V, Cr, Mn, Fe, Co, Ni, Cu, Zn, Ru, Rh, Pd, Re, Os, Ir, Pt, Mo and Nb, substituting at one or more titanium sites in Ti—O—X, doping between Ti—O—X crystal lattices, doping to crystalline grain boundary of Ti—O—X, or a combination of these methods. A simultaneous doping of both cationic and anionic speies enhances the catalytic activity of the photocatalyst.

By including such anionic species into an oxide, or by further doping cationic species, a new level is formed in a band gap of the oxide which becomes standard, resulting in a photocatalyst which absorbs visible light, as described in, for example, International Publication (PCT Gazette) Numbers WO 01/10552A1 and WO 01/10553A1 and, for titanium oxide, Japanese Patent Application No. 2000-19310.

The porous medium is preferably formed from ceramics such as alumina, silica, zirconia and titanium oxide; diatomaceous earth, zeolite, sepiolite and activated carbon, or from a composite or mixture of them. Such substances do not readily decompose when in contact with a photocatalytic material, and are therefore preferable for forming a porous medium for supporting the photocatalyst thereon.

Preferably, the porous medium comprises mesopores. It is further suitable that the porous medium has a honeycomb structure. Such porous medium can maintain a high catalytic activity of the photocatalyst material.

DETAILED DESCRIPTION OF THE PREFERRED EMBODIMENT

An embodiment of the present invention will be described with reference to the drawings.

Figure 1:
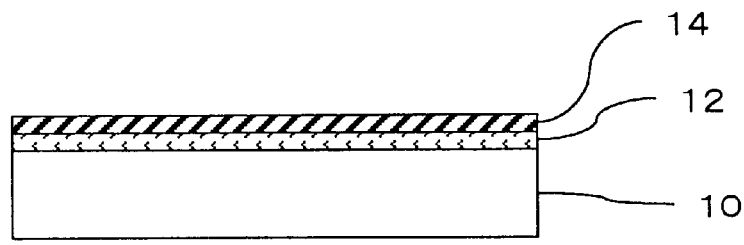
FIG. 1 is a diagram showing a structure of the photocatalytic substance according to the present invention.

FIG. 1 is a diagram showing a structure of the photocatalytic substance according to the present embodiment, wherein a porous medium 12 is formed on a substrate 10, and a photocatalytic material 14 is formed on the porous medium 12. In the figure, the porous medium 12 and the photocatalytic material 14 are schematically shown in a multilayered structure, but, in practice, the photocatalytic material 14 is also supported into the pores of the porous medium 12.

Here, for the photocatalytic material 14, an example photocatalyst material formed of MOaXb (M is metal, O is oxygen, X is any element, a=1.5 to 2.0 and b=0.01 to 0.5) and working under visible light was used.

Especially, titanium (Ti) is suitable for M, and one or both of nitrogen (N) and sulfur (S) is suitable for X. In other words, it is suitable that one or both of nitrogen (N) and sulfur (S) as anions are doped in atomicity of over 0 and not more than 13% to titanium oxide (TiOx).

Also, tin (Sn), zinc (Zn) or their mixture may be used instead of Ti for M, and N, S, P, B, C, Cl, As, Se, Br, Sb, Te, I and the like can be used for X.

Further, it is suitable that at least one of V, Cr, Mn, Fe, Co, Ni, Cu, Zn, Ru, Rh, Pd, Re, Os, Ir, Pt, Mo and Nb be contained in the photocatalytic material 14, by partly substituting at titanium sites in Ti—O—X crystal, doping between Ti—O—X crystal lattices, doping to Ti—O—X crystalline grain boundaries, or a combination of these methods. The photocatalytic function can be improved by codoping of both anionic and cationic speies.

The porous medium 12 may be formed of alumina, silica, zirconia, titanium oxide or their mixture. Especially, FSM (Folded Sheet Mesoporous Material) formed of silica as described in Japanese Patent Application Laid-Open Publication No. Hei 09-178292 or MCM (see Japanese National Stage Laid-Open Publication No. Hei 5-503499) are suitable for the porous medium. Such FSM and MCM are formed of thin films having honeycomb structure with uniform pores.

For the substrate 10, various substrates can be used. In the present embodiment, the photocatalytic material 14 is supported on the porous medium 12 so that the substrate 10 is in direct contact only with the porous medium 12, and is thereby prevented from coming into direct contact with the photocatalytic material 14. As long as they satisfy this condition, various types of materials can be used for the substrate 10.

The catalytic function of photocatalytic material 14 tends to promote decomposition of organic substances. Therefore, when the photocatalytic material 14 is formed directly on the substrate 10, the substrate 10 will be decomposed. However, according to this embodiment of the present invention, direct contact of the photocatalytic material 14 with the substrate 10 is prevented by the porous medium 12 therebetween, and decomposition of the substrate 10 as a result of the catalytic reaction is inhibited. Accordingly, materials such as paper, cloth, plastic or the like can be used as the substrate 10. Materials such as glass and metal can also be used when preferable. It is also suitable that the granular porous medium 12 or the like be used without the substrate 10. It is also suitable that zeolite, silica or alumina oxide porous medium, activated carbon, or the like be used as the substrate 10 and that the photocatalytic material 14 be supported on the porous substrate 10.

Photocatalytic Material

As an example of the photocatalytic material 14 used in this embodiment, Ti—O—N which has nitrogen (N) doped to titanium oxide ($TiO_2$), will be described. The electronic state of a $TiO_2$ semiconductor is changed by doping N or Ti—O—N, and a new absorption band is formed in a band gap of titanium oxide. As a result, it becomes possible to absorb not only ultraviolet light, but also visible light so that a photocatalytic reaction is observed in response to exposure to visible light.

Figure 2:
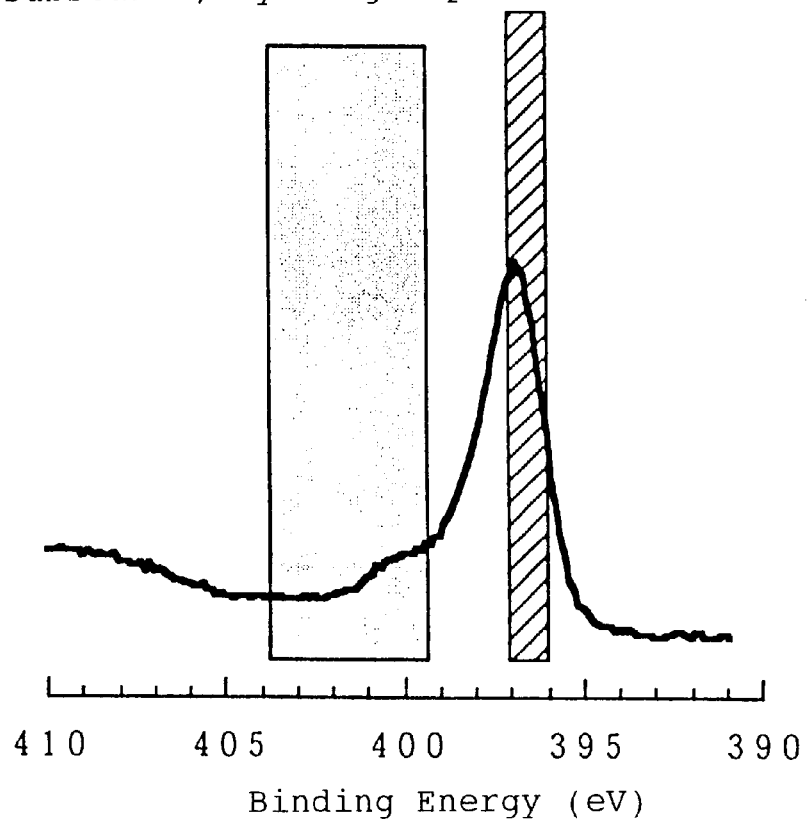
FIG. 2 is a diagram showing a N1s shell XPS profile of a Ti—O—N photocatalyst.

An N1s shell XPS(X-ray photoemission spectroscopy) profile of Ti—O—N is shown in FIG. 2. It can be seen from FIG. 2 that a binding energy peak is seen at about 396 to 397 eV, and therefore deduced that there is a bond of titanium and nitrogen (Ti—N). Here, titanium oxide may have a crystalline structure of anatase and rutile or an amorphous structure, and nitrogen may be doped. When nitrogen is doped, the doped nitrogen and a titanium atom are chemically bonded. Photocatalytic activity in visible light is high when such a chemical bond exists.

Therefore, in this embodiment a photocatalytic material 14 comprising chemically bonded titanium and nitrogen is used.

As described above, when sulfur (S) or the like is doped instead of nitrogen (N), a photocatalyst which reacts under visible light can be obtained.

The photocatalytic material 14 can be produced by various types of production methods, but with an RF sputtering method is preferable. By this sputtering method Ti—O—N is supported on the porous medium by using at least one of oxynitride, titanium oxide, titanium nitride, or metallic titanium as a target material in an atmosphere containing nitrogen gas. Other types of sputtering as well as methods such as deposition and ion plating can be employed. Ti—O—N can also be produced by oxidizing titanium nitride or nitrogen plasma processing of titanium oxide, as described in International Laid-open Publication Numbers WO 01/10552A1 and WO 01/10553A1.

Figure 3:
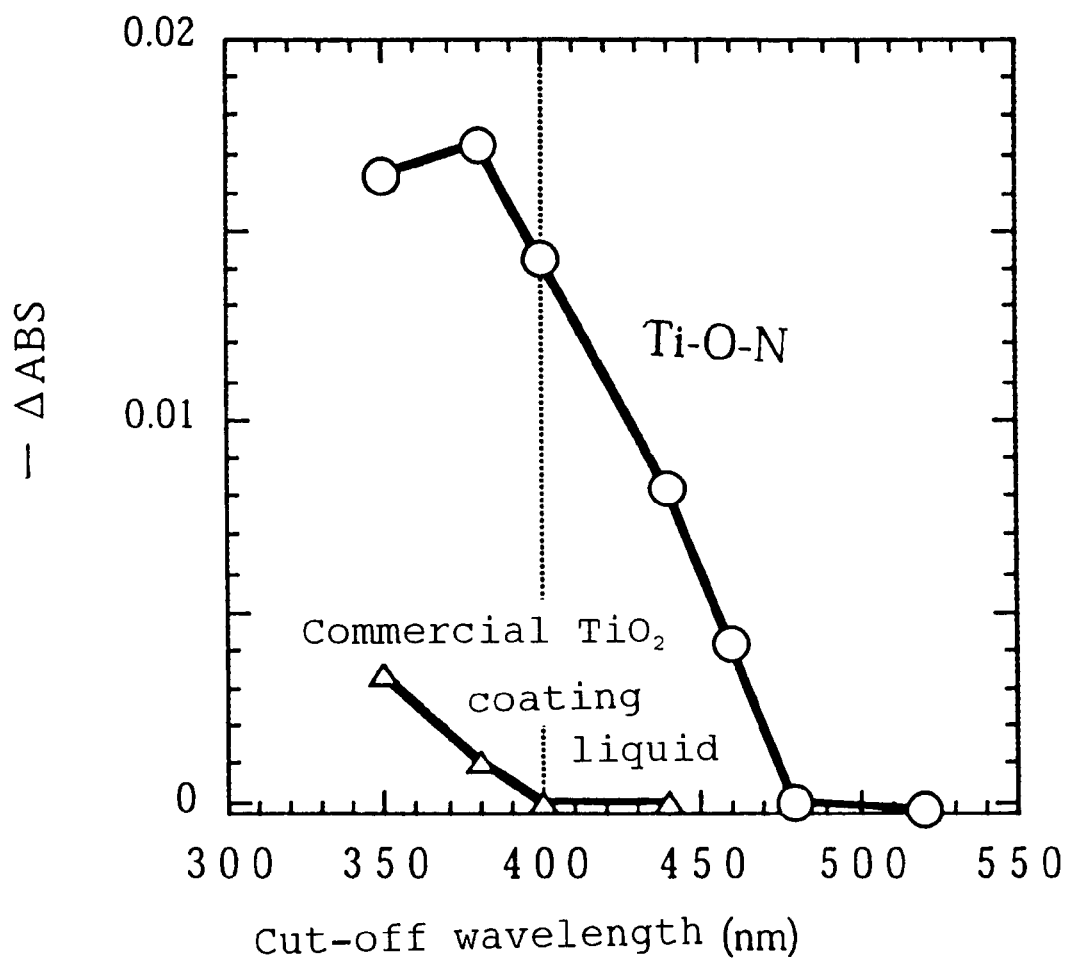
FIG. 3 is a diagram showing the dependence of a Ti—O—N photocatalytic property on a wavelength.

FIG. 3 shows dependence on the irradiated light wavelength of the photocatalytic activities of a Ti—O—N photocatalyst film containing about 7% of nitrogen atom and conventional titanium oxide ($TiO_2$). It is apparent from FIG. 3 that conventional titanium oxide exhibits no photocatalytic activity in any visible range of wavelengths of 400 nm or more, but that Ti—O—N of the present invention demonstrates a catalytic activity under light in the visible range up to a wavelength of about 470 nm.

The catalytic activity was evaluated by measuring the decomposition of adsorbed methylene blue as a change in optical absorption property ($\Delta ABS$).

Using a white fluorescent light (manufactured by Toshiba Lighting & Technology Corporation; 1760 lux illumination) having a wavelength $\lambda \geq 350$ nm as the light source for irradiation of light, the experiment was performed while light of shorter wavelengths were gradually eliminated. To eliminate the light on the short wavelength side, commercially available light filters (manufactured by Fuji Film Co., Ltd.) were used.

The Ti—O—N employed in this experiment had a material composition ratio of $Ti_{33}O_{60}N_7$ and an atomic number ratio of Ti/(O+N)<0.5. Meanwhile, it was confirmed that Ti—O—N in a range of composition ratio of Ti/(O+N)>0.5 such as $Ti_{35}O_{53}N_{12}$ having an oxygen defect provided the photocatalytic action in a wavelength range of $\lambda \geq 500$ nm.

With this measuring method, there exists a possibility that methylene blue might be decolored by reduction but not by oxidation. Therefore, after the experiment it was confirmed that the methylene blue decoloring was caused not by reduction, but by oxidation.

Next, effects of supporting $Ti_{33}O_{60}N_7$ having an atomic number ratio of Ti/(O+N)<0.5 on a porous medium and effects of thermal treatment will be described.

Figure 4:
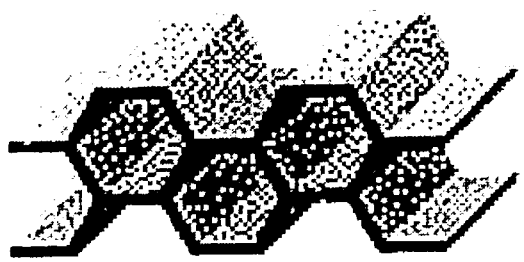
FIG. 4 is a diagram showing a structure of FSM(Folded Sheet Mesoporous Material)

FIG. 4 shows a structure of FSM (Folded Sheet Mesoporous Material) which is a mesoporous medium made of silicon oxide (silica). FSM has a honeycomb structure comprised of cylindrical pores with a hexagonal diameter of about 1 to 10 nm and a constant interval and may be synthesized by reacting a surfactant agent with layered silicates. The structure is formed by bending each of layers at a predetermined interval of 2 to 12 nm, and bonding their protruded portions.

Other applicable porous material includs mesoporous molecular sieves (MCM) synthesized by means of a micellar structure of a surfactant used as a mold. MCM also has a structure with regularly arranged cylindrical pores having a diameter of 1 to 10 nm and honeycomb cross section.

The oxide porous material may be made of pure silica, but may also be a mixture of silica with aluminum (Al), titanium (Ti), magnesium (Mg), zirconium (Zr), gallium (Ga), beryllium (Be), yttrium (Y), lanthanum (La), tin (Sn), lead (Pb), vanadium (V), boron (B) or the like.

In an example, FSM having a thickness of 300 nm was formed on a glass substrate, and Ti—O—N was deposited thereon by sputtering. The FSM had a pore diameter of about 3 nm.

Figure 5:
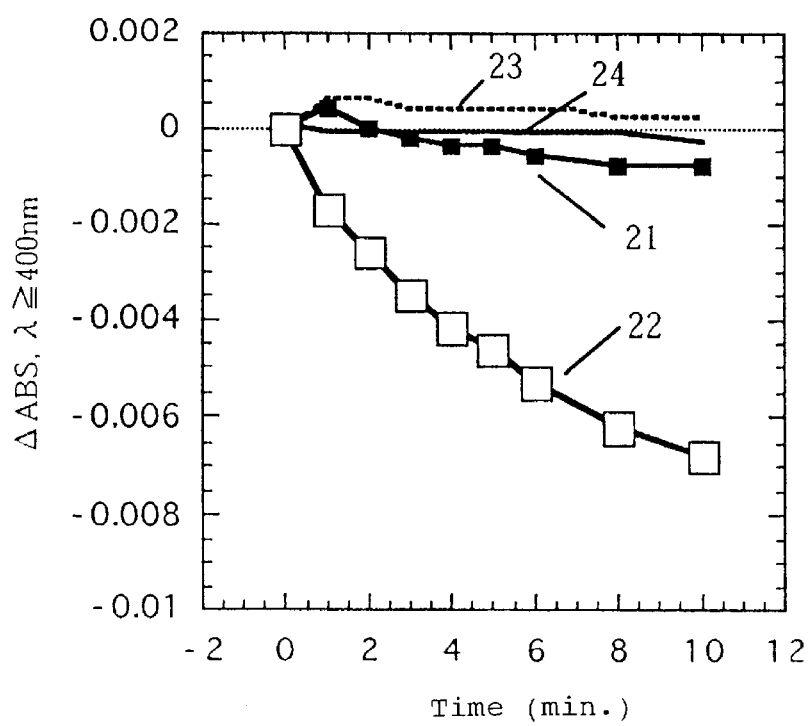
FIG. 5 is a diagram showing a property of the photocatalytic substance comprising Ti—O—N formed on FSM on a substrate.

FIG. 5 shows a catalytic performance of the photocatalytic substance which has Ti—O—N deposited on FSM formed on the glass substrate. In FIG. 5, line 21 indicates a property of the photocatalyst having Ti—O—N deposited on a surface of FSM without thermal treatment, line 22 indicates a property of of the photocatalyst having Ti—O—N deposited on a surface of FSM with thermal treatment in an atmosphere of nitrogen at 550° C., line 23 indicates a property of the photocatalyst having Ti—O—N directly deposited on a glass substrate without thermal treatment, and line 24 indicates a property of the photocatalyst having Ti—O—N directly deposited on a glass substrate with thermal treatment at 550° C. The photocatalytic film was obtained by sputtering a titanium oxide target in mixed plasma (2.4 Pa) of nitrogen and argon gas.

It can be seen from FIG. 5 that a material produced through sputtering without thermal treatment indicated with line 21 shows a visible photocatalytic property twice or greater than those of line 23 for a material without thermal treatment and line 24 for a material with thermal treatment, both produced by direct deposition of Ti—O—N on the glass substrate. Line 22 showing the results obtained by Ti—O—N formed on FSM and then thermally treated shows a reaction rate 15 or more times than that of the Ti—O—N directly deposited on a glass substrate.

Thus, it was found that supporting Ti—O—N on FSM remarkably enhanced the photocatalytic function. This is because FSM has very small projections and depression on its surface.

The same effects were also observed when materials such as Ti—O—N—Fe, Ti—O—N—V, Ti—O—N—Cu and Ti—O—N—Co were used as the photocatalyst material.

Figure 6:
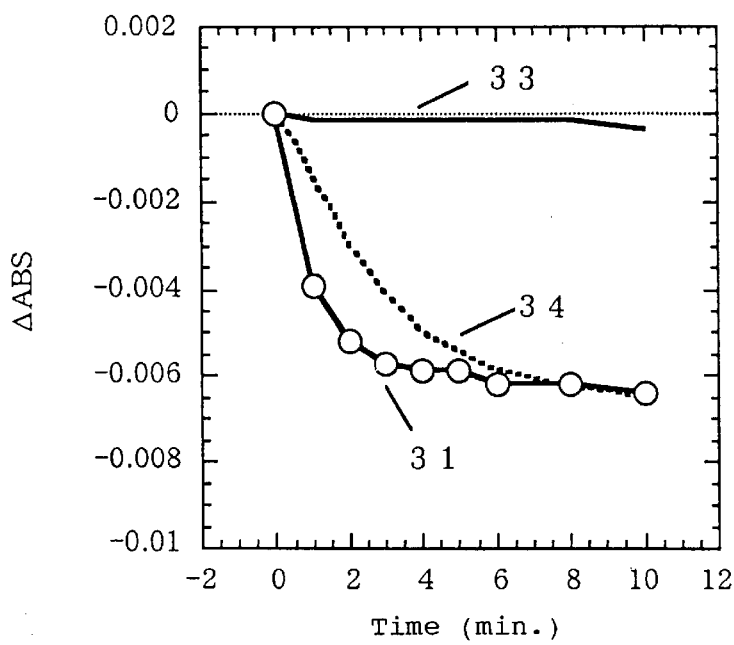
FIG. 6 is a diagram showing a property of the photocatalytic substance comprising Ti—O—N formed on FSM on a substrate.

FIG. 6 shows experimentally observed photocatalytic properties of photocatalytic bodies having pores of FSM vertically oriented on a surface of a glass substrate and Ti—O—N deposited within FSM and on its surface by sputtering. This vertically oriented FSM has a cubit structure. In the figure, line 31 indicates a property obtained by depositing Ti—O—N into FSM and on its surface (without a thermal treatment), line 33 indicates a property obtained by charging Ti—O—N onto a glass substrate (without a thermal treatment), and line 34 indicates a property obtained by depositing Ti—O—N onto a glass substrate (with a thermal treatment at 550° C.).

Sputtering was performed in an atmosphere of 40% of $N_2$ and 60% of Ar gas at a sputtering gas pressure of 0.5 Pa. For determining the photocatalytic properties, a 10W white fluorescent tube whose surface was covered with an ultraviolet light elimination filter (SC42 made by Fuji Photo Film Co., Ltd.) was used as a visible light source for irradiating light with a wavelength of $\lambda \geq 400$ nm. The light irradiated from the visible light source was measured by a UV power meter (UVR-2 made by TOPCON with a detector UD36) to find that ultraviolet light intensity was 0.0 $\mu W/cm^2$. The photocatalytic property was evaluated by the absorbance change ($\Delta ABS$) due to decomposition of methylene blue as described above.

The Ti—O—N film formed on the glass substrate has an amorphous structure with a flat surface and a small specific surface area. Therefore, the photocatalytic activity was below the limit of detection in visible light as indicated with the line 33 in FIG. 6.

When the film was thermally treated in an atmosphere of nitrogen at 550° C. for 90 minutes a crystalline layer of anatase and rutile was generated. As a result, the photocatalytic property in visible light was improved as indicated with line 34 in FIG. 6.

When Ti—O—N was charged into the vertically oriented FSM and onto its surface, a high photocatalytic activity in visible light was produced without thermally treating as indicated by line 31.

Thus, it is demonstrated that the photocatalytic substance of the present invention, having a Ti—O—N photocatalyst supported on the surface of and inside the vertically oriented FSM, a high photocatalytic activity can be obtained under ultraviolet radiation and under visible light, without performing thermal treatment. The photocatalytic property can be further improved by thermally treating the photocatalytic substance to enhance the Ti—O—N crystallinity.

FSM or MCM can be formed into a thin film, such that these materials can be formed on a surface having any shape, such as a curved surface or an irregular surface. Also, FSM or MCM can be easily formed on a substrate, such as fiber or paper, because they can be formed into a film by heating a solution at a low temperature of about 20 to 70° C. As described above, the photocatalyst material such as Ti—O—N is supported on FSM. Thus, Ti—O—N does not come into direct contact with fiber or paper, and FSM can prevent the substrate such as fiber or paper from being decomposed by Ti—O—N.

In experimental testing, MCM was formed on paper at a temperature of 100° C. or below, then Ti—O—N was formed thereon. A high photocatalytic activity was obtained under irradiation of just visible light. Moreover, the decomposition of paper was substantially zero. Although formation of pores in MCM was insufficient under the above conditions, it was found that MCM still proved to be a sufficient supporting material for Ti—O—N.

In addition, to obtain the effect of improvement of the photocatalytic activity under the visible light with the porous medium, such as a zeolite, sepiolite, diatomaceous earth, aluminum oxide, silica or zirconia porous medium or activated carbon as a substrate may be used, and Ti—O—N or the like may be deposited on its surface. In this manner, an effective catalytic activity can be obtained by a visible light workable photocatalyst formed on the porous medium.

Any combination of vacuum deposition, CVD, a physical mixing method, an impregnation method, a fixation method, a method of dispersing fine powder into a solution and coating it, or the like may be preferably employed as deposition method of Ti—O—(N, S) on the porous medium.

Furthermore, by containing nitrogen into tin oxide or zinc oxide, similar photocatalytic action is exhibited under irradiation of visible light, and the effect is remarkably improved in combination with the porous medium of the present invention.

While there has been described that what is at present considered to be a preferred embodiment of the invention, it is to be understood that various modifications may be made thereto, and it is intended that the appended claims cover all such modifications as fall within the true spirit and scope of the invention.

What is claimed is:

1. A photocatalytic substance, comprising:
   a porous material; and a photocatalytic material comprising $MO_aX_b$, wherein M is Ti, O is an oxygen, X is N, a=1.5 to 2.0, and b=0.01 to 0.5, supported on the porous material and which operates when exposed to visible light, and wherein $MO_a$ comprises a crystal structure, and X is doped to $MO_a$, and wherein the porous material has a pore diameter of 3–10 nm.

2. The photocatalytic substance according to claim 1, wherein said porous medium is formed of alumina, silica, zirconia, titanium oxide, activated carbon, a mixture thereof or a composite thereof.

3. The photocatalytic substance according to claim 1, wherein said porous medium has mesopores.

4. The photocatalytic substance according to claim 3, wherein said porous medium has a honeycomb structure.

5. The photocatalytic substance according to claim 4, wherein said porous medium is formed on a substrate.

6. The photocatalytic substance according to claim 5, wherein said pores of said porous medium are oriented in a direction perpendicular to a surface of the substrate.

* * * * *

UNITED STATES PATENT AND TRADEMARK OFFICE
CERTIFICATE OF CORRECTION

PATENT NO.    : 6,680,277 B2
DATED         : January 20, 2004
INVENTOR(S)   : Morikawa et al.

It is certified that error appears in the above-identified patent and that said Letters Patent is hereby corrected as shown below:

<u>Title page, Item [54] and Column 1, line 1,</u>
Title, should read -- PHOTOCATALYTIC SUBSTANCE --

Signed and Sealed this

Fourth Day of May, 2004

JON W. DUDAS
*Acting Director of the United States Patent and Trademark Office*